July 2, 1957　　　C. F. GLADEN　　　2,797,621
ROTARY REFLECTOR
Filed Dec. 17, 1952

INVENTOR.
Carl F. Gladen
BY
Fearman & Fearman
ATTORNEYS

… … …

2,797,621

ROTARY REFLECTOR

Carl F. Gladen, Bay City, Mich.

Application December 17, 1952, Serial No. 326,523

1 Claim. (Cl. 88—81)

This invention relates to reflectors in general and more particularly to a rotary reflector adapted to be mounted on the handle-bar of a bicycle, velocipede, or other vehicle.

One of the prime objects of my invention is to provide a novel reflector of highly ornamental design for bicycles, velocipedes and vehicles of all kinds, which spins when the vehicle is in motion, thus being visible from all sides and angles and materially contributing to the safety of night riding or cycling.

A further object of the invention is to design a rotary reflector which is neat and pleasing in appearance, and which creates a unique and attractive visual effect as it revolves.

Another object of the invention is to design a rotary reflector which requires no power other than the movement or speed of the velocipede, bicycle or vehicle on which it is mounted to effect the driving or revolving of the reflector.

A further object of the invention is to design a reflector of pleasing appearance, which is simple and practical, which appeals to children and others as a novelty, and which effectively serves as a visual warning signal, thus preventing accidents and possible injury to others.

A still further object of the invention is to design a reflector of light yet durable construction which lends itself to quantity production so that it can be economically manufactured in large quantities and marketed at a low price.

With the above and other objects in view, the present invention consists in the combination and arrangement of parts, hereinafter more fully described, illustrated in the accompanying drawing, and more particularly pointed out in the appended claim, it being understood that changes may be made in the form, size, proportion, and minor details of construction, without departing from the spirit, or sacrificing any of the advantages of the invention.

Figure 2:
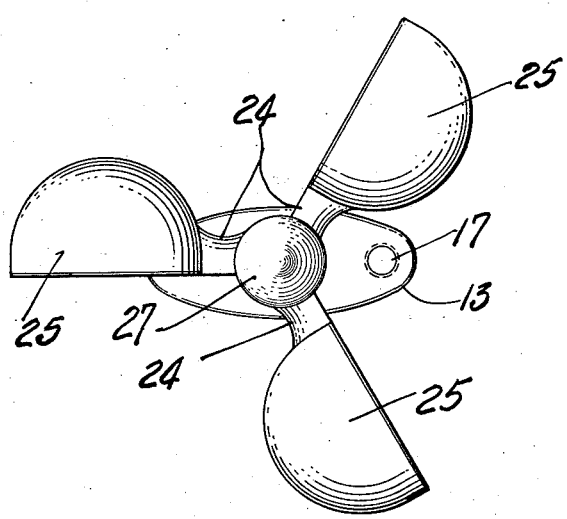
Fig. 2 is a top plan view thereof.

Referring now more particularly to the accompanying drawing in which I have shown the preferred embodiment of my invention, a letter R generally indicates my reflector unit which is preferably formed of lightweight plastic, and includes a tapered base or bracket post 10, the lower portion of which is centrally recessed as at 11 and spread to form diverging legs 12 which are adapted to rest on and accommodate the handle-bar H of a bicycle (not shown). The legs 12 terminate in horizontal sections 13 and are hollow as shown at 14 (see Fig. 3 of the drawing) to conserve material.

A curved clamping plate 15, shaped similar to the leg sections of the post 10, accommodates the lower portion of the handle-bar H, said plate being formed with mating flanges 16, and vertically aligned, threaded bores 17 are provided in the sections 13 and 16 to accommodate clamping screws 18 which serve to securely clamp the device in position on the handle-bar, and while in the instant application I have shown the device clamped in position, it will be understood that the legs may be eliminated and a suction cup substituted, without departing from the spirit of the invention. A centrally disposed, vertical passage 19, square in cross-section, is provided in the upper end of the post 10 and terminates at a point directly adjacent the hollow section in the post.

Figure 3:
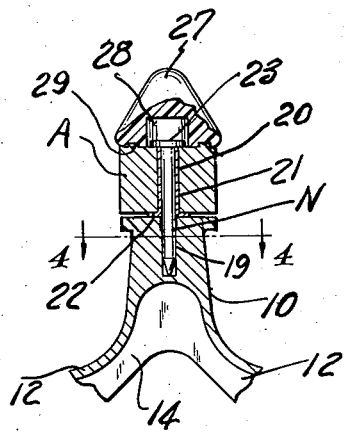
Fig. 3 is a fragmentary, part sectional, elevational view of the device.
Figure 1:
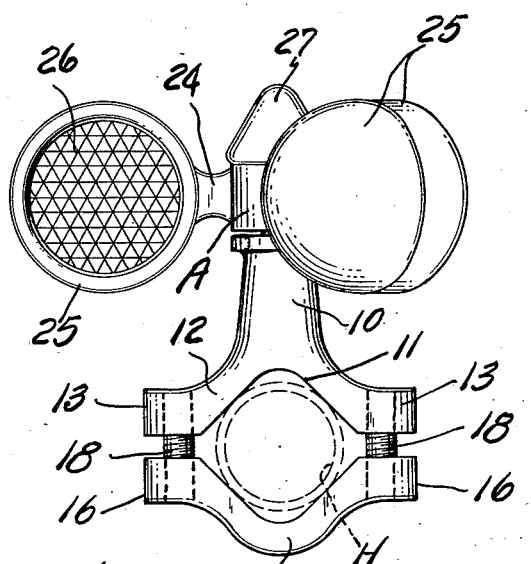
Fig. 1 is an elevational view of the reflector mounted on the handle-bar of a bicycle, the handle-bar being indicated in broken lines.
Figure 4:
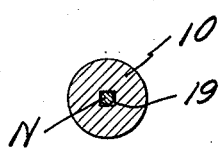
Fig. 4 is a sectional, plan view taken on the line 4—4 of Fig. 3.

The revolvable reflector assembly or unit A is mounted on the post 10, and is also preferably formed of plastic, the hub 20 being centrally bored as shown in Fig. 3 to accommodate a bushing 21 which is provided in said core, the lower end of the bushing being flanged as at 22 and bears on the upper end of the post 10, and a conventional nail or spindle N is mounted in said bushing, extending downwardly into the passage 19 with the head 23 bearing on the upper end of the hub 20, the nail or spindle being a tight press fit in the lower end section passage 19 to anchor it securely in position, while the upper end is slightly larger than the nail body so that the nail is readily insertable in position.

Arms 24 are moulded integral with the hub 20 and radiate therefrom, each arm terminating in a cup-shaped housing 25 in which a red reflector disk 26 is mounted, and while in the instant application I have shown but three arms and reflectors, it will be understood that any desired number may be employed, the surface areas of these flat reflector housings 25 being sufficiently large to insure rapid rotation of the reflector unit due to wind pressures created as the bicycle or vehicle is propelled or driven along a highway or the like.

A cap member 27 is mounted on the upper end of the member A, being cored as at 28 to accommodate the head 23 of the nail 19, the upper end of the member and the lower marginal edge of the cap 27 being formed with interfitting lugs 29 to hold the cap in position, this cap facilitating the assembly of the unit A, protecting the bushing from dust and dirt and providing an ornamental finish for the unit.

When the bicycle or other unit is being propelled or driven over the roadway, the spinning of the reflector unit provides a warning signal visible to a motorist approaching the traveling bicycle from the side, or from the opposite direction, so that danger of collision or other accident, with property damage and danger to the rider or occupant, is eliminated.

From the foregoing description, it will be obvious that I have perfected a simple, practical and ornamental reflector unit which lends itself to quantity production, which utilizes a common nail as a spindle, and which can be easily and quickly applied to bicycles, velocipedes and other vehicles to provide a revolving reflector or signal.

What I claim is:

A wind driven rotary reflector device comprising a vertical plastic post; bracket means connected to said post for clamping the latter on the handle bar of a bicycle or the like; a vertically disposed elongated passage of substantially square cross-section in said plastic post open to the upper end of the latter; a spindle of circular cross-section of greater diameter than the width of the passage driven into said passage and gripped in said passage so as to be non-rotatably anchored therein, said spindle having one end thereof projecting beyond the upper end of said post; a rotary unit having a hub and radially extending arms secured to said hub; means revolvably mounting said hub on said spindle between said upper end of said post and said one end of said spindle; a semispherical member having a reflective face shaped to offer wind resistance mounted at the radially outer end of each of said arms to impart rotary movement to said unit in a wind whereby on rotation of said unit light reflecting from said reflective faces creates a flashing effect; an enlargement at said one end of said spindle for restraining axial movement of said rotary unit on said spindle; a frusto conical cap member having a recess at its lower end of such size as freely to receive said enlargement and enclose the latter; and cooperable, interengageable means on said hub and said cap member for detachably securing the latter to said hub for rotation therewith.

References Cited in the file of this patent

UNITED STATES PATENTS

| | | |
|---|---|---|
| 516,910 | Bucherer | Mar. 20, 1894 |
| 1,262,074 | McCollum | Apr. 9, 1918 |
| 1,550,413 | Ananian | Aug. 18, 1925 |
| 1,590,341 | Zeis | June 29, 1926 |
| 1,910,923 | Kerr | May 23, 1933 |
| 2,151,485 | Pawsat | Mar. 21, 1939 |
| 2,642,777 | Bradler | June 23, 1953 |